(12) United States Patent
Darling

(10) Patent No.: US 9,929,414 B2
(45) Date of Patent: Mar. 27, 2018

(54) REACTANT FLOW CHANNEL CONFIGURATION TO FACILITATE WATER REMOVAL

(75) Inventor: Robert Mason Darling, South Windsor, CT (US)

(73) Assignee: AUDI AG, Ingolstadt (DE)

( * ) Notice: Subject to any disclaimer, the term of this patent is extended or adjusted under 35 U.S.C. 154(b) by 45 days.

(21) Appl. No.: 14/426,358

(22) PCT Filed: Sep. 7, 2012

(86) PCT No.: PCT/US2012/054102
§ 371 (c)(1),
(2), (4) Date: Mar. 5, 2015

(87) PCT Pub. No.: WO2014/039048
PCT Pub. Date: Mar. 13, 2014

(65) Prior Publication Data
US 2015/0244003 A1    Aug. 27, 2015

(51) Int. Cl.
| | |
|---|---|
| *H01M 8/0258* | (2016.01) |
| *H01M 8/0247* | (2016.01) |
| *H01M 8/0254* | (2016.01) |
| *H01M 8/026* | (2016.01) |
| *H01M 8/04119* | (2016.01) |
| *H01M 8/0228* | (2016.01) |

(52) U.S. Cl.
CPC ....... *H01M 8/026* (2013.01); *H01M 8/04156* (2013.01); *H01M 8/0228* (2013.01)

(58) Field of Classification Search
None
See application file for complete search history.

(56) References Cited

U.S. PATENT DOCUMENTS

| | | | |
|---|---|---|---|
| 7,659,024 B2 | 2/2010 | Matsumoto et al. | |
| 2007/0154744 A1* | 7/2007 | Darling | H01M 8/0258 429/437 |
| 2007/0190392 A1 | 8/2007 | Kim et al. | |

(Continued)

FOREIGN PATENT DOCUMENTS

| | | |
|---|---|---|
| CN | 101350411 A | 1/2009 |
| CN | 10585927 C | 1/2010 |

(Continued)

OTHER PUBLICATIONS

English translation of JP 2005-190983 (2005).*

(Continued)

*Primary Examiner* — Yoshitoshi Takeuchi
(74) *Attorney, Agent, or Firm* — Seed Intellectual Property Law Group LLP

(57) ABSTRACT

An exemplary fuel cell component comprises a reactant distribution plate including a plurality of channels configured for facilitating gas reactant flow such that the gas reactant may be used in an electrochemical reaction for generating electricity in a fuel cell. Each of the channels has a length that corresponds to a direction of reactant gas flow along the channel. A width of each channel is generally perpendicular to the length. A depth of each channel is generally perpendicular to the width and the length. At least one of the width or the depth has at least two different dimensions at a single lengthwise location of the channel.

13 Claims, 2 Drawing Sheets

(56) References Cited

U.S. PATENT DOCUMENTS

| | | | |
|---|---|---|---|
| 2009/0011310 A1 | 1/2009 | Trabold et al. | |
| 2009/0136789 A1* | 5/2009 | Pien | C25B 1/06 |
| | | | 429/514 |
| 2011/0097639 A1 | 4/2011 | Darling et al. | |

FOREIGN PATENT DOCUMENTS

| | | | | |
|---|---|---|---|---|
| JP | 2005-190983 | * | 7/2005 | ............. H01M 8/02 |
| JP | 2005-190983 A | | 7/2005 | |
| JP | 2007-220570 A | | 8/2007 | |
| JP | 2009-104987 A | | 5/2009 | |
| JP | 2010/102904 | * | 5/2010 | ............. H01M 8/02 |
| JP | 2010-102904 A | | 5/2010 | |
| WO | 2006/121157 A1 | | 11/2006 | |
| WO | 2011/112520 A1 | | 9/2011 | |

OTHER PUBLICATIONS

English translation of JP 2010/102904 (2010).*
PCT International Search Report dated Feb. 18, 2013 for PCT Application No. PCT/US2012/054102.

* cited by examiner

REACTANT FLOW CHANNEL CONFIGURATION TO FACILITATE WATER REMOVAL

BACKGROUND

Fuel cells are useful as sources of electricity. Fuel cells use a known electrochemical reaction for generating electrical energy. Reactants such as hydrogen and oxygen are used in the electrochemical reaction.

One of the challenges associated with fuel cell operation is managing the presence of water within a fuel cell. So-called flooding conditions can interfere with fuel cell efficiency resulting in poor performance. Additionally, carbon corrosion is possible when water accumulation in a reactant fuel flow channel causes fuel starvation at various locations.

SUMMARY

An exemplary fuel cell component comprises a reactant distribution plate including a plurality of channels configured for facilitating gas reactant flow such that the gas reactant may be used in an electrochemical reaction for generating electricity in a fuel cell. Each of the channels has a length that corresponds to a direction of reactant gas flow along the channel. A width of each channel is generally perpendicular to the length. A depth of each channel is generally perpendicular to the width and the length. At least one of the width or the depth has at least two different dimensions at a single lengthwise location of the channel.

The different width or depth dimensions establish two channel portions. At least one of the channel portions tends to remain clear of any liquid water so that reactant gas may continue to flow along the length of the channel even when liquid water is present within the channel.

Various embodiments will become apparent to those skilled in the art from the following detailed description of example embodiments. The drawings that accompany the detailed description can be briefly described as follows.

DETAILED DESCRIPTION

Figure 1:
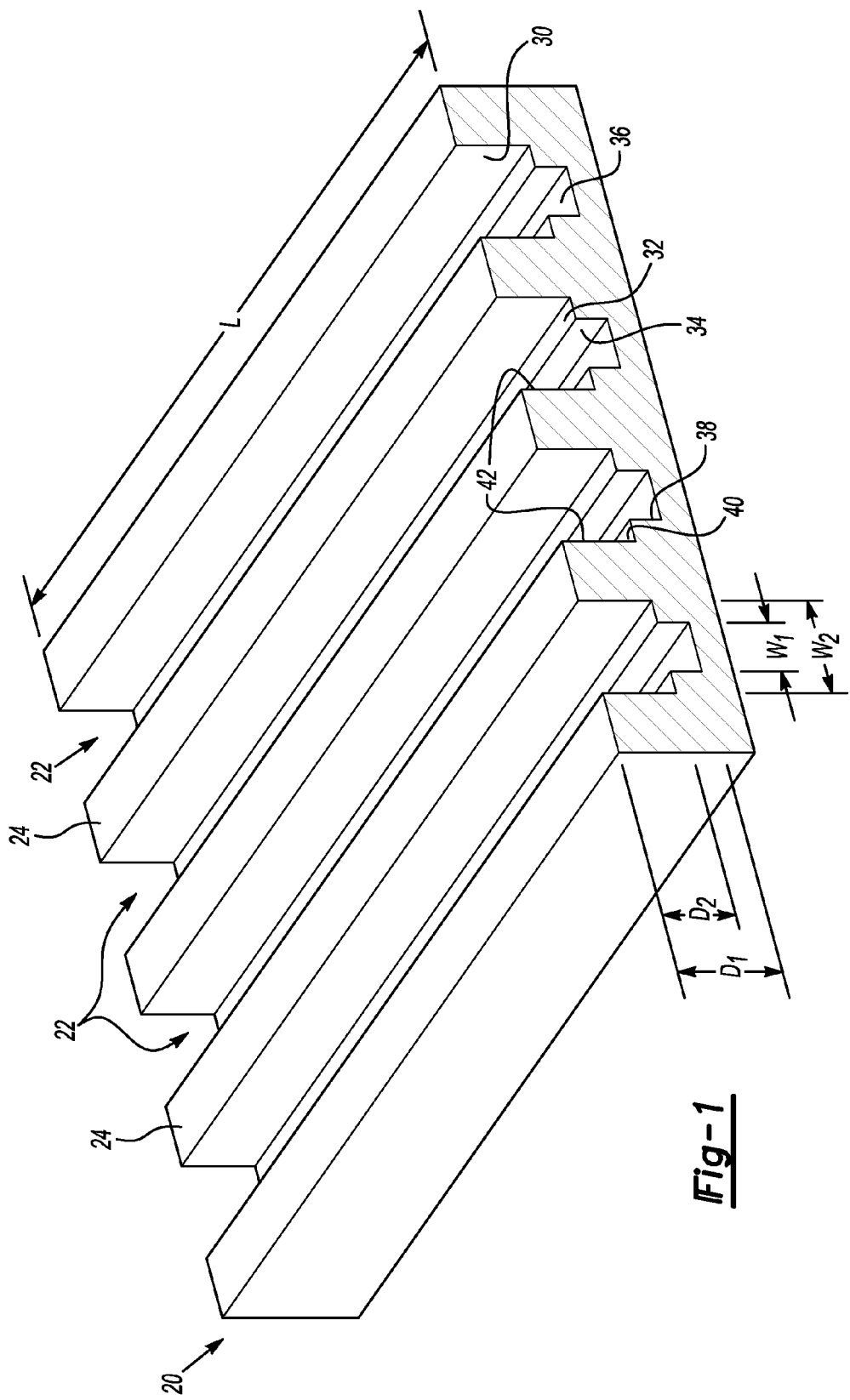
FIG. 1 is a diagrammatic, perspective illustration of an example fuel cell component having reactant flow channels designed according to an embodiment of this invention.

FIG. 1 shows an example fuel cell component. A reactant distribution plate 20 includes a plurality of channels 22 and ribs 24. The channels 22 are configured for facilitating gas reactant flow. It is known how to incorporate a reactant distribution plate into a fuel cell assembly. The example channels 22 are configured to facilitate gas reactant flow such that the gas reactant may be used in an electrochemical reaction for generating electricity in a fuel cell.

Each of the channels 22 has a length L corresponding to a direction of gas flow through the channel. Each channel 22 includes a width W dimension that is generally perpendicular to the length L. Each channel in this example has at least two different width dimensions. Two width dimensions $W_1$ and $W_2$ are illustrated in FIG. 1. Each channel also has a depth dimension that is generally perpendicular to the length and the width. The illustrated example includes at least two different depth dimensions. Depth dimensions $D_1$ and $D_2$ are shown.

In this example, each channel 22 includes multiple surfaces. A first surface 30 extends between an outside edge of the channel 32 to a second surface 32. The distance between the second surface 32 and the outside edge corresponds to the depth $D_2$. A third surface 34 is parallel to the first surface 30 and perpendicular to the second surface 32. A fourth surface 36 is spaced from the outside edge a distance corresponding to the depth $D_1$.

Fifth and sixth surfaces 38 and 40 are situated similarly to the second and third surfaces 32 and 34 but on an opposite side of the channel 22. The distance between the surfaces 34 and 38 corresponds to the width $W_1$. A seventh surface 42 extends between the sixth surface 40 and the outside edge of the corresponding side of the channel 22. The distance between the surfaces 30 and 42 corresponds to the width $W_2$.

The different width dimensions and the different depth dimensions in the illustrated example exist at the same lengthwise location in the channel 22. In other words, taking a cross-section of the gas reactant distribution plate 20 in a direction perpendicular to the length L includes the different width and different depth dimensions. In the illustrated example, there are different width and depth dimensions along the entire length of each channel.

Figure 2:
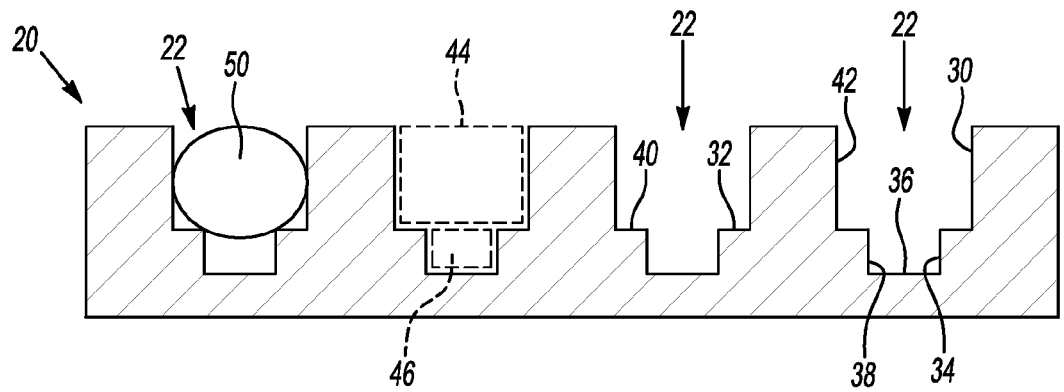
FIG. 2 is a cross-sectional illustration showing selected features of one example embodiment.

As can be appreciated from FIG. 2, which is a cross-sectional illustration of an example embodiment, the different width dimensions and the different depth dimensions establish two channel portions 44 and 46 along each channel 22. The two channel portions facilitate allowing gas flow along each channel 22 even when liquid water has accumulated in the channel. The configuration of each channel 22 facilitates the liquid water gathering in one of the portions 44 or 46 while the other portion remains at least partially clear of water to permit gas flow through the channel.

FIG. 2 schematically shows liquid water at 50 within one of the channels 22. The different dimensions within the channel and the configuration of the illustrated example facilitates the water 50 tending to collect in the first portion 44 of the channel. The second portion 46 in this example remains clear such that gas may flow through at least the second portion 46 of the channel.

One feature of the illustrated example is that continued reactant gas flow through the second portion 46 tends to urge the liquid water 50 to be carried out of the channel 22. The illustrated configuration not only allows for a continuous flow of reactant gas through each channel 22 but also facilitates removing liquid water as reactant gas continues to move through the channel.

In the example of FIG. 2, the material of the gas reactant distribution plate is hydrophobic at least along the inside surfaces 30-42 of the channels 22. The two different capillary radii of the illustrated example tend to destabilize water droplets resulting in water accumulation of the type schematically shown at 50 in FIG. 2. Such a drop or bubble of liquid water tends to get carried out of the channel by the continued gas reactant flow through the second portion 46 of the channel 22.

Figure 3:
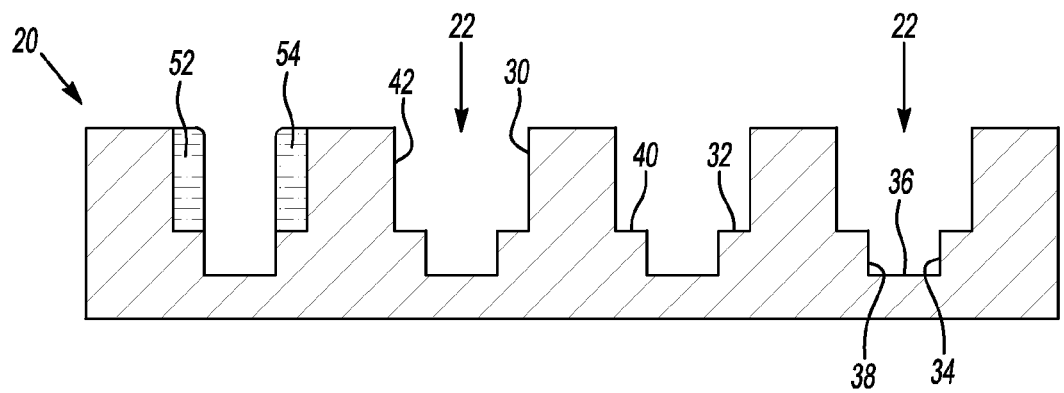
FIG. 3 is a cross-sectional illustration showing selected features of another example embodiment.
Figure 4:
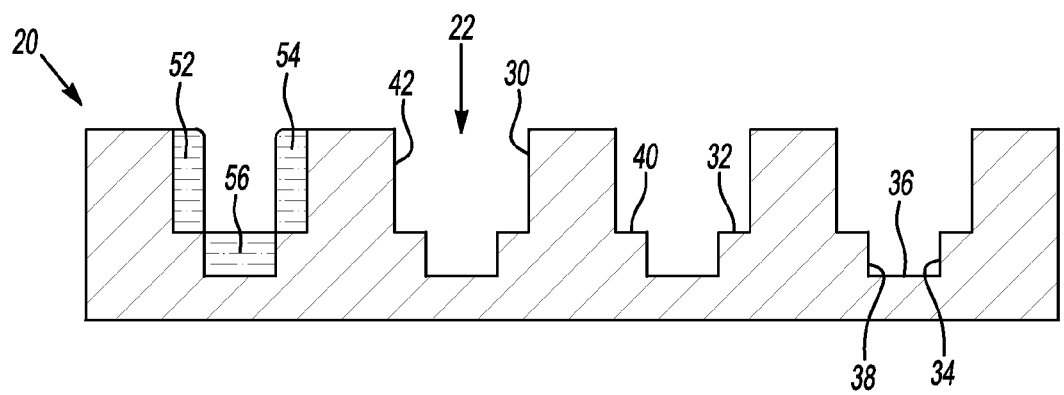
FIG. 4 is a cross-sectional illustration showing the example of FIG. 3 in another condition.

FIGS. 3 and 4 show another example in which the material used for making the gas reactant distribution plate 20 is hydrophilic at least along the surfaces 30-42 of the channels 22. The hydrophilic surfaces tend to cause any liquid water present within the channels to cling toward the surfaces. The two different capillary radii established by the dimensions $W_1$, $W_2$, $D_1$ and $D_2$ in this example tend to destabilize the water film. Any liquid water within the channels 22 in the examples of FIGS. 3 and 4 has a tendency to enter the region with a smaller capillary radius. FIG. 3 shows liquid water schematically at 52 and 54 within one of the channels. As can be appreciated, a substantial portion of the channel remains open for reactant gas flow through the channel 22. FIG. 4 schematically illustrates additional liquid water 56 accumulated within the channel 22. In this example, at least some of the first portion 44 of the channel 22 remains open for gas reactant flow through that channel.

In some examples, at least one of the surfaces within the channels 22 is hydrophilic while at least one of the other surfaces is hydrophobic. Such examples allow for selectively directing water content within a channel 22 while realizing the benefit of having different dimensions within the channel for establishing different portions of the channels to handle any liquid water accumulation in a manner that does not prevent reactant gas flow through a channel.

The configuration of the flow channels 22 prevents liquid water from blocking off any of the channels. This ensures better gas reactant distribution within a fuel cell. The illustrated examples provide enhanced gas reactant access, enhanced fuel cell performance and reduced carbon corrosion.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell component, comprising:
   a reactant distribution plate including a plurality of channels, a gas reactant flows among the plurality of channels to facilitate an electrochemical reaction for generating electricity in a fuel cell, each of the channels having:
   a length that corresponds to a direction of gas reactant flow along the channel; and
   being defined at least in part by:
      a first pair of opposing, upstanding planar surfaces extending in a direction which is perpendicular to the length and being spaced apart to define a first width of the channel at a lengthwise location and to define an end surface which extends between the first pair of opposing, upstanding planar surfaces; and
      a second pair of opposing, upstanding planar surfaces extending in the direction which is perpendicular to the length and being spaced apart to define a second width of the channel at the lengthwise location that is different than the first width,
   wherein interior surfaces of the channel defined at least in part by the first pair of opposing, upstanding planar surfaces, the second pair of opposing, upstanding planar surfaces, and the end surface include at least one hydrophobic interior surface and at least one hydrophilic interior surface.

2. The fuel cell component of claim 1, wherein:
   the first pair of opposing, upstanding planar surfaces, in part, define a first channel portion having a first cross-sectional area at the lengthwise location; and
   the second pair of opposing, upstanding planar surfaces, in part, define a second channel portion having a second, different cross-sectional area at the location.

3. The fuel cell component of claim 2, wherein:
   the first channel portion has a first cross-sectional geometry; and
   the second channel portion has a second cross-sectional geometry.

4. The fuel cell component of claim 3, wherein the first and second cross-sectional geometries are the same shape.

5. The fuel cell component of claim 4, wherein the first and second cross-sectional geometries are rectangular.

6. The fuel cell component of claim 2, wherein the first channel portion includes a first depth in a direction which is perpendicular to the length and the second channel portion includes a second depth in the direction which is perpendicular to the length, the first depth being different from the second depth at the lengthwise location.

7. The fuel cell component of claim 1 wherein the reactant distribution plate includes a first surface and an opposing, second surface, the channels through which the gas reactant flows extend through the first surface to define channel floor surfaces between ribs, the channel floor surfaces being substantially parallel to the first and the second surfaces of the reaction distribution plate.

8. The fuel cell component of claim 7 wherein the second surface is substantially planar and continuous.

9. A fuel cell system, the system comprising:
   the fuel cell component of claim 1; and
   a source of gas reactant coupled to the channels, the source providing the gas reactant which flows among the plurality of channels.

10. A fuel cell component, comprising:
    a reactant distribution plate including a plurality of channels and a plurality of ribs, the ribs spaced apart to define the channels between adjacent ribs, a gas reactant flows among the plurality of channels to facilitate an electrochemical reaction for generating electricity in a fuel cell, each channel including:
    a length that corresponds to a direction of gas reactant flow along the channel; and being defined at least in part by:
       a first pair of opposing, upstanding planar surfaces of adjacent ribs extending in a direction which is perpendicular to the length and being spaced apart to define a first width of the channel at a lengthwise location and to define an end surface which extends between the first pair of opposing, upstanding planar surfaces; and
       a second pair of opposing, upstanding planar surfaces of adjacent ribs extending in the direction which is perpendicular to the length and being spaced apart to define a second width of the channel at the lengthwise location, the second width being different than the first width,
    wherein interior surfaces of the channel defined at least in part by the first pair of opposing, upstanding planar surfaces, the second pair of opposing, upstanding planar surfaces, and the end surface include at least one hydrophobic interior surface and at least one hydrophilic interior surface.

11. The fuel cell component of claim 10 wherein the reactant distribution plate includes a first surface and an opposing, second surface, the channels through which the gas reactant flows extend through the first surface to define channel floor surfaces between the ribs, the channel floor surfaces being substantially parallel to the first and the second surfaces of the reactant distribution plate.

12. The fuel cell component of claim 11 wherein the second surface is substantially planar and continuous.

13. A fuel cell system, the system comprising:
the fuel cell component of claim 10; and
a source of gas reactant coupled to the channels, the source providing the gas reactant which flows among the plurality of channels.

* * * * *